United States Patent [19]

Yamagami et al.

[11] Patent Number: 5,323,233
[45] Date of Patent: Jun. 21, 1994

[54] IMAGE SIGNAL PROCESSING APPARATUS HAVING A COLOR FILTER WITH OFFSET LUMINANCE FILTER ELEMENTS

[75] Inventors: Taku Yamagami; Takashi Sasaki, both of Yokohama; Akira Suga, Tokyo, all of Japan

[73] Assignee: Canon Kabushiki Kaisha, Tokyo, Japan

[21] Appl. No.: 735,796

[22] Filed: Jul. 25, 1991

[30] Foreign Application Priority Data

Jul. 31, 1990 [JP] Japan .................................. 2-204779
Jul. 31, 1990 [JP] Japan .................................. 2-204780
Jul. 31, 1990 [JP] Japan .................................. 2-204782

[51] Int. Cl.⁵ .................................................. H04N 9/07
[52] U.S. Cl. ..................................... 348/277; 348/280; 348/276
[58] Field of Search ........................ 358/41, 42, 43, 44; H04N 9/04, 9/07

[56] References Cited

U.S. PATENT DOCUMENTS

| | | | |
|---|---|---|---|
| 3,739,079 | 6/1973 | Noda | 358/43 |
| 3,794,408 | 2/1974 | Ian | 358/42 |
| 3,971,065 | 7/1976 | Bayer | 358/44 |
| 4,282,547 | 8/1981 | Morishita | 358/44 |
| 4,288,812 | 9/1981 | Rhodes | 358/44 |
| 4,390,895 | 6/1983 | Sato | 358/44 |
| 4,638,352 | 1/1987 | Noda | 358/44 |
| 4,641,183 | 2/1987 | Kinoshita | 358/44 |
| 4,646,139 | 2/1987 | Takei | 358/44 |
| 4,751,567 | 6/1988 | Hashimoto | 358/44 |
| 4,860,092 | 8/1989 | Hieda | 358/44 |
| 5,018,006 | 5/1991 | Hashimoto | 358/43 |
| 5,043,821 | 8/1991 | Suga et al. | 358/43 |

FOREIGN PATENT DOCUMENTS

| | | |
|---|---|---|
| 57-89385 | 6/1982 | Japan . |
| 58-182978 | 10/1983 | Japan . |
| 59-127495 | 7/1984 | Japan . |
| 59-205882 | 11/1984 | Japan . |
| 60-55783 | 4/1985 | Japan . |
| 60-70887 | 4/1985 | Japan . |
| 60-89187 | 5/1985 | Japan . |
| 313192 | 1/1991 | Japan . |

Primary Examiner—James J. Groody
Assistant Examiner—Sherrie Hsia
Attorney, Agent, or Firm—Fitzpatrick, Cella, Harper & Scinto

[57] ABSTRACT

An image detection apparatus includes a color filter for receiving light and for passing luminance components and color components of the light. The color filter has first and second lines which filter elements for luminance components disposed in each line and offset from filter elements for luminance components in an adjacent line, the first line including filter elements for two color components, and the second line including filter elements for a single color component. An image sensor unit receives the luminance and color components passed by the color filter, and outputs signals corresponding to the respective luminance components and color components. A signal processing unit receives the signal output by the image sensor unit, and generates a color difference signal from the received signals.

20 Claims, 10 Drawing Sheets

$$\frac{1}{64} \begin{bmatrix} & & & 1 & & & \\ & & -5 & 0 & -5 & & \\ & -5 & 0 & 25 & 0 & -5 & \\ 1 & 0 & 25 & 0 & 25 & 0 & 1 \\ & -5 & 0 & 25 & 0 & -5 & \\ & & -5 & 0 & -5 & & \\ & & & 1 & & & \end{bmatrix}$$

FIG. 6

$$\frac{1}{64} \begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}$$

$$\frac{1}{12} \begin{pmatrix} 1 & 2 & 3 & 4 & 5 & 6 & 5 & 4 & 3 & 2 & 1 \end{pmatrix}$$

FIG. 11

| Y | Cy | Y | Cy | Y | Cy |
|---|----|---|----|---|----|
| Ye | Y | Ye | Y | Ye | Y |
| Y | Cy | Y | Cy | Y | Cy |
| Ye | Y | Ye | Y | Ye | Y |

FIG. 12

| Y | Cy | Y | Cy | Y | Cy |
|---|----|---|----|---|----|
| Y | Cy | Y | Cy | Y | Cy |
| Ye | Y | Ye | Y | Ye | Y |
| Ye | Y | Ye | Y | Ye | Y |

IMAGE SIGNAL PROCESSING APPARATUS HAVING A COLOR FILTER WITH OFFSET LUMINANCE FILTER ELEMENTS

BACKGROUND OF THE INVENTION

1. Field of the Invention

This invention relates to an image signal processing apparatus. It has particular application to an image signal processing apparatus having an image pickup device and a color filter.

2. Description Related Art

In the prior art there is known an image pickup device which has a stripe color filter or a mosaic color filter and also there is known an image pickup device which has a "Bayer type" mosaic color filter as described in U.S. Pat. No. 3971,065.

Figure 2:
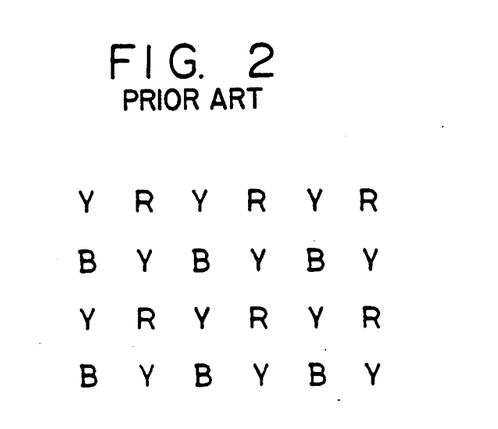
FIGS. 2 and 3 illustrate color filters in the prior art.

In the Bayer type filter, the filter portions "Y" that pass luminance component of light are arranged offset in adjacent lines as shown in FIG. 2. Accordingly by adopting the Bayer type filter, the image pickup apparatus can achieve better resolution because it has a finer effective pitch for the Y filter portions. The finer effective pitch arises because the horizontal positions of the Y filter portions in one line are offset from the horizontal positions of the Y filter portions in the next line, and taking the two lines together a Y filter portion pitch can be achieved which is twice as fine as the pitch for one line alone.

However, in the above prior art Y filter portions have higher transparency than R or B filter portions, with the result that the image sensor tends to saturate more easily behind the Y filter portions than behind other filter portions. When the Y sensor portions saturate before other color sensor portions, false color signals tend to result, which is undesirable.

Figure 3:
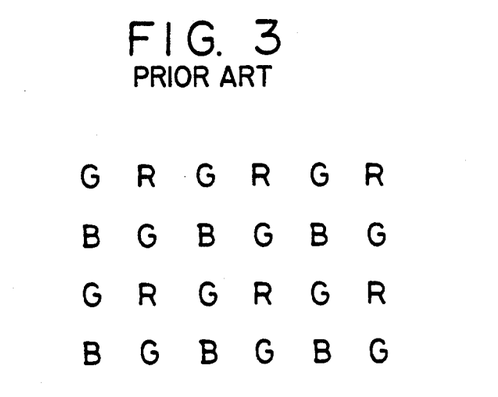

In order to solve this problem the color filter such as shown in FIG. 3 is known.

By adopting this kind of filter, color reproduction is improved, ut on the other hand spatial resolution tends to be reduced because the G signal replaces the Y signal in the output of the sensor. The Y signal can be obtained from the R, G and B signals, but the increase in effective Y resolution from the Bayer type filter is lost. This applies especially to an image having very little G signal, such as a predominantly red image.

SUMMARY OF THE INVENTION

An object of the present invention is to provide an image signal processing apparatus that can resolve the above mentioned problems.

Another object of the present invention is to provide an image pickup apparatus having a high quality image without many false signals.

A still further object of the present invention is to provide a color filter which will provide or enable a better characteristic when used with an appropriate image pick-up device.

In one aspect the present invention provides a color filter having first portions for passing a luminance component of an image and second portions for passing a color component of the image, the first portions being arranged in an offset manner so that in two lines of the filter (which are not necessarily adjacent) the positions of the first portions are different, characterised in that the second portions are also arranged in an offset manner.

The color filter may also comprise third portions for passing another color component of the image. Such portions may also be arranged in an offset manner. Fourth portions for passing yet another color component are also possible. Where respective portions for several color components are provided, it is not always necessary for the portions for each color component to be arranged in an offset manner.

The offset arrangement of portions for passing a color component improves the resolution and effective pitch for that color, for the actual density of filter portions for the color component.

In a further aspect of the present invention there is provided image detection apparatus comprising (i) color filter means, (ii) image sensor means for sensing light which has passed through the color filter means; and (iii) signal processing means for processing signals from the image sensor means, in which the color filter means has a plurality of sets of filter portions for passing respective components of the image which sets of filter portions have different respective spectral pass band characteristics and one of which sets passes a luminance component of the image, the image sensor means provides respective signals from image sensor portions sensing light passed by filter portions of the respective sets, and the signal processing means receives at least some of the signals and generates therefrom color difference signals, characterised in that the respective pass band characteristics for the sets of filter portions corresponding to the signals from which the color difference signals are generated are such that image sensor portions sensing light passed by filter portions of different sets tend to saturate at similar levels of image brightness.

Preferably the respective sets of filter portions each pass substantially all incident light at a respective wavelength, i.e. none of them have a neutral density function in addition to any spectral selectivity. A neutral density function tends to reduce the overall sensitivity of the image detection apparatus. The sets of filter portions corresponding to the signals from which the color difference signals are generated may include a set which passes a luminance component of the image and a set which passes a color component with a high transparency. Alternatively they may comprise sets which pass different respective color components. Because the signals from which the color difference signals are generated tend to saturate at similar levels of image brightness, there is a reduction in the tendency for the color difference signals to give false color information by being generated from a signal which is not saturated and a signal which is saturated.

In another aspect of the present invention there is provided image detection apparatus comprising: (i) color filter means; (ii) image sensor means for sensing light which has passed through the color filter means; and (iii) signal processing means for processing signals from the image sensor means, in which the color filter means has a first set of portions for passing a luminance component of an image and a plurality of further sets of portions for passing respective color components of the image, the image sensor provides luminance signals from image sensor portions which sense light passed by filter portions of the first set and respective color signals from image sensor portions which sense light passed by filter portions of respective ones of the further sets, and the signal processing means receiving the respective color signals and generating therefrom a color difference signal independently of the luminance signal.

Preferably the color difference signal represents the difference between a color component of the image and the luminance of the image. By generating the color difference signal independently of the luminance signal, color distortions due to saturation of the image sensor portions for the luminance component are reduced or eliminated.

Preferably the plurality of further sets of filter portions comprises a second set, a third set and a fourth set, for passing three respective color components, the image sensor means provides first, second and third respective color signals and the signal processing means generates therefrom first and second color difference signals.

In yet another aspect of the present invention, there is provided a color filter having a first set of portions for passing a luminance component of an image and a further set of portions for passing a color component of the image, the color component being one of cyan, yellow and magenta. Cyan, yellow and magenta filters tend to have higher transparency than red, green and blue filters, and pass a greater proportion of incident white light. Thus the image brightness at which an image sensor portion sensing light passed by one of these filters tends to saturate is closer to the saturation brightness of the luminance sensing portions than the saturation brightness of a red, green or blue sensing portion is to the saturation brightness of the luminance sensing portions. This reduces the tendency to produce false color signals which arise because the luminance sensing portions have saturated but the color sensing portions have not.

Preferably there are at least two sets of color filter portions, each set for passing a respective one of cyan, yellow and magenta.

Further objects, features and advantages of the invention will appear more fully from the following description of embodiments given by way of non-limiting examples.

BRIEF DESCRIPTION OF DRAWINGS

FIG. 1 (a) illustrates a color filter of a first embodiment of the present invention;

DETAILED DESCRIPTION OF THE PRESENT INVENTION

FIGS. 1(a)-1(e) illustrate a color filter of a first embodiment of the present invention. In this filter Y filter portions are located in an offset manner in successive lines as in a Bayer type filter. R and B filter portions are each provided in every second line, and at a pitch separation four times the cell pitch separation of the filter. The R and B filter portions are located in respective offset patterns to improve the horizontal resolution of the corresponding color signals. G filter portions are located in a rectangular pattern at two times cell pitch separation to provide the G color signal with a higher resolution than the R and B color signals.

Figure 4:
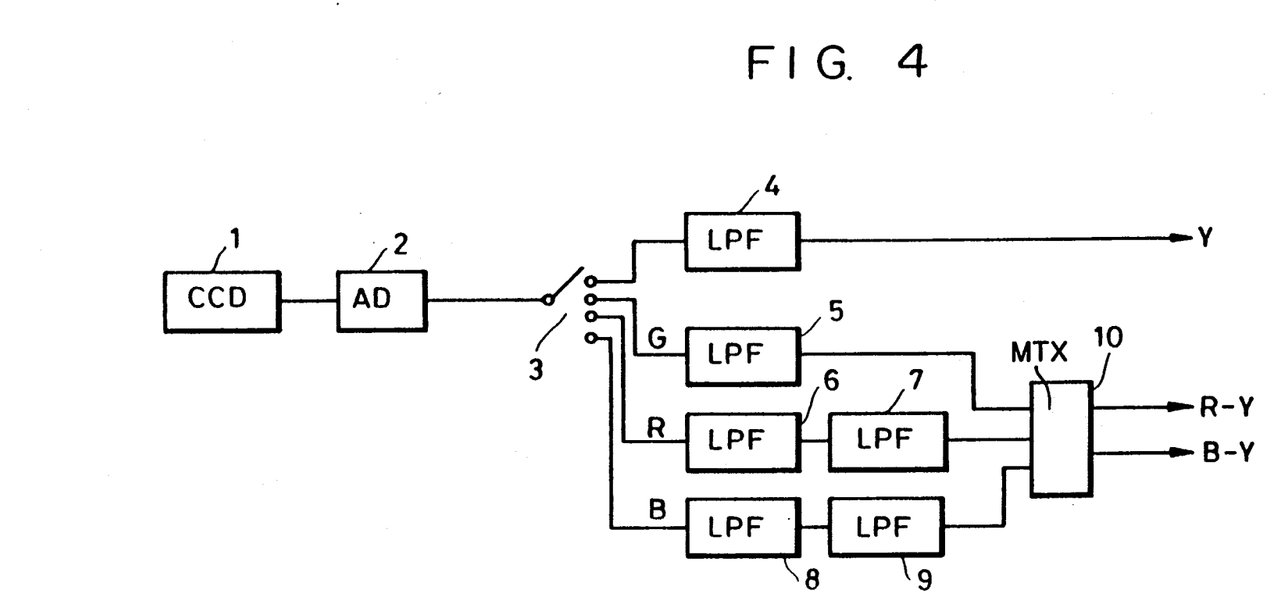
FIG. 4 illustrates a signal processing circuit suitable for the color filter shown in FIG. 1(a)

FIG. 4 illustrates a block diagram of a signal processing circuit suitable for use with the above color filter. In this figure a CDS (Correlated Double Sampling) circuit, a white balance circuit or a gamma conversion circuit etc which are not important to explain the present invention are omitted for simplifying purposes.

Figure 1A:
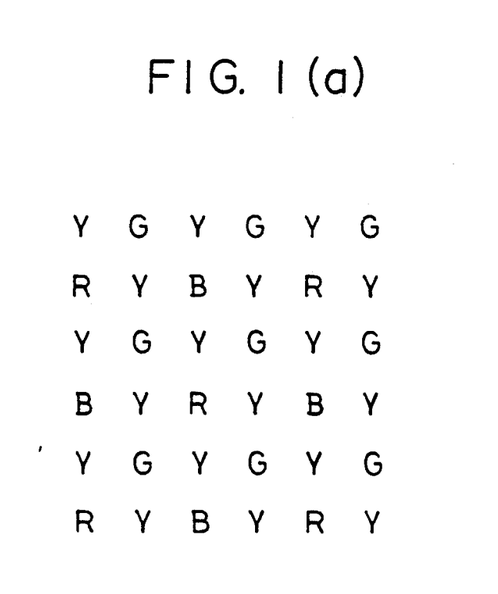
Figure 1B:
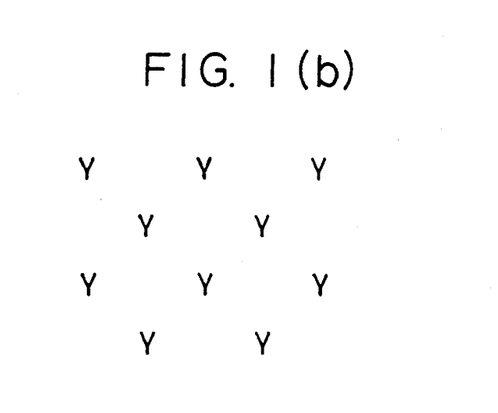
FIGS. 1(b) to 1(e) illustrate respective sampling patterns of Y, G, R, B components.
Figure 1C:
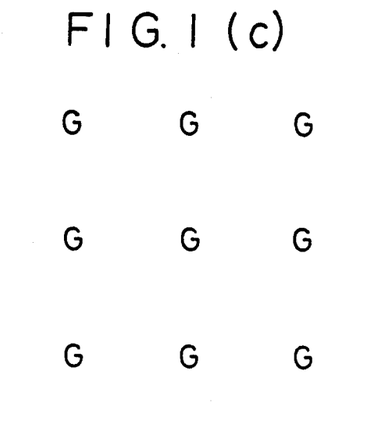
Figure 1D:
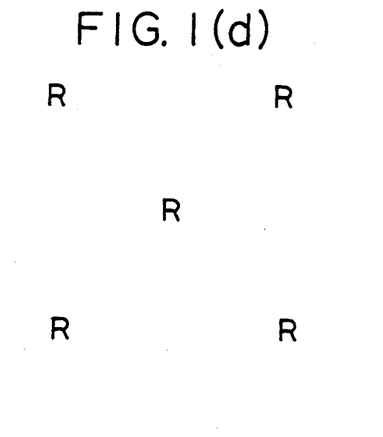
Figure 1E:
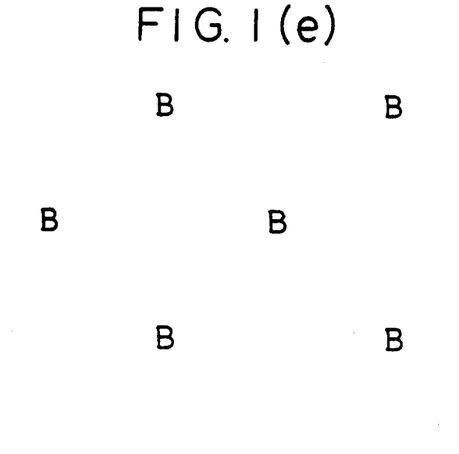

An image pickup device 1 has the color filter as shown in FIG. 1(a) and comprises, for example, a CC image pickup device 1.

In the present description it is assumed that the CCD 1 scans the filter horizontally with vertical sub-scanning. As will be apparent to those skilled in the art, if the image sensor or pick-up device scans vertically with horizontal sub-scanning the horizontal and vertical directions in the present description should be exchanged.

Figure 5:
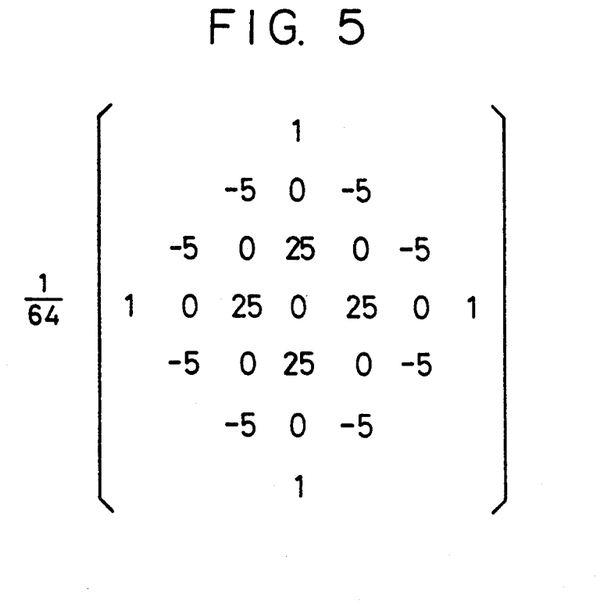
FIG. 5 illustrates filter coefficients for a filter 4 in FIG. 4.

An output signal read out from the image pickup device 1 is converted into a digital signal by an A to D converter 2, then is separated to low pass interpolating filters, 4,5,6,8 by a separating circuit 3. A Y signal is interpolated by an interpolating filter 4 which is for example a two dimensional FIR (Finite Impulse Response) filter whose details may be as shown in FIG. 5. R, G and B signals are interpolated similarly.

Figure 6:
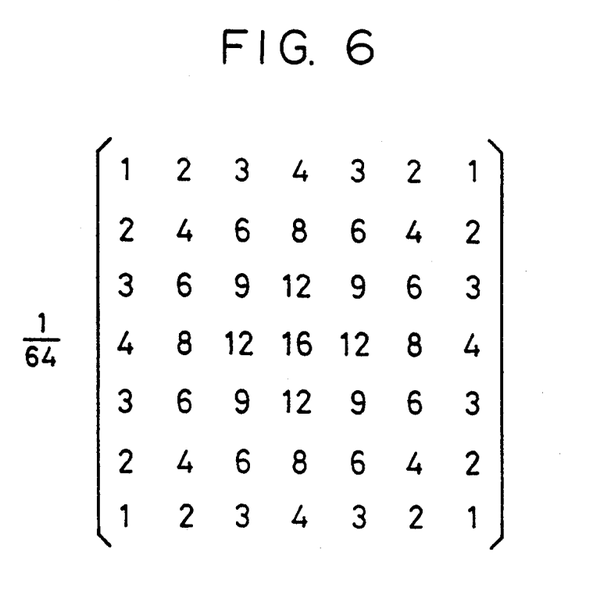
FIG. 6 illustrates filter coefficients for a filter 5 in FIG. 4.

The interpolating filter 5 for the G signal has a coefficient matrix as shown in FIG. 6. The R and B signals are firstly interpolated by respective first interpolating filters 6,8. These first interpolating filters 6,8 are for interpolating the offset sampling. Then the outputs of the first filters 6,8 are respectively interpolated by second interpolating filters 7,9 which have the same structure as the filter 5 for the G signal.

The first filters 6,8 can be almost the same as the filter 4 for the Y signal, but the filtering pitch spacings of the filters 6,8 are twice that of the filter 4. The R, G and B signals from the filters 5,7,9 are linearly converted into R-Y and B-Y color difference signals by a matrix circuit 10.

The filters have different delay times so that the circuit of FIG. 4 also has delay time adjusting means such as one or more delay circuits, e.g. combined with the matrix circuit 10.

In the circuit of FIG. 4 the B-Y and R-Y signals are generated from the R, G and B signals from the CCD 1, and not from the Y signal from the CCD 1. Therefore if the Y sensor portions of the CCD 1 saturate but the R, G and B portions do not, this will not cause false color information in the B-Y and the R-Y signals. However, the Y output signal is generated from the Y signal from the CCD 1, providing good resolution and sensitivity in the Y output.

In the embodiment of FIG. 4, a plurality of signals are processed in parallel for real time processing. However, if the present invention is applied to a slower processing system sequential processing can be adopted. In that case some low pass filters can each be used for more than one color signal.

Figure 7:
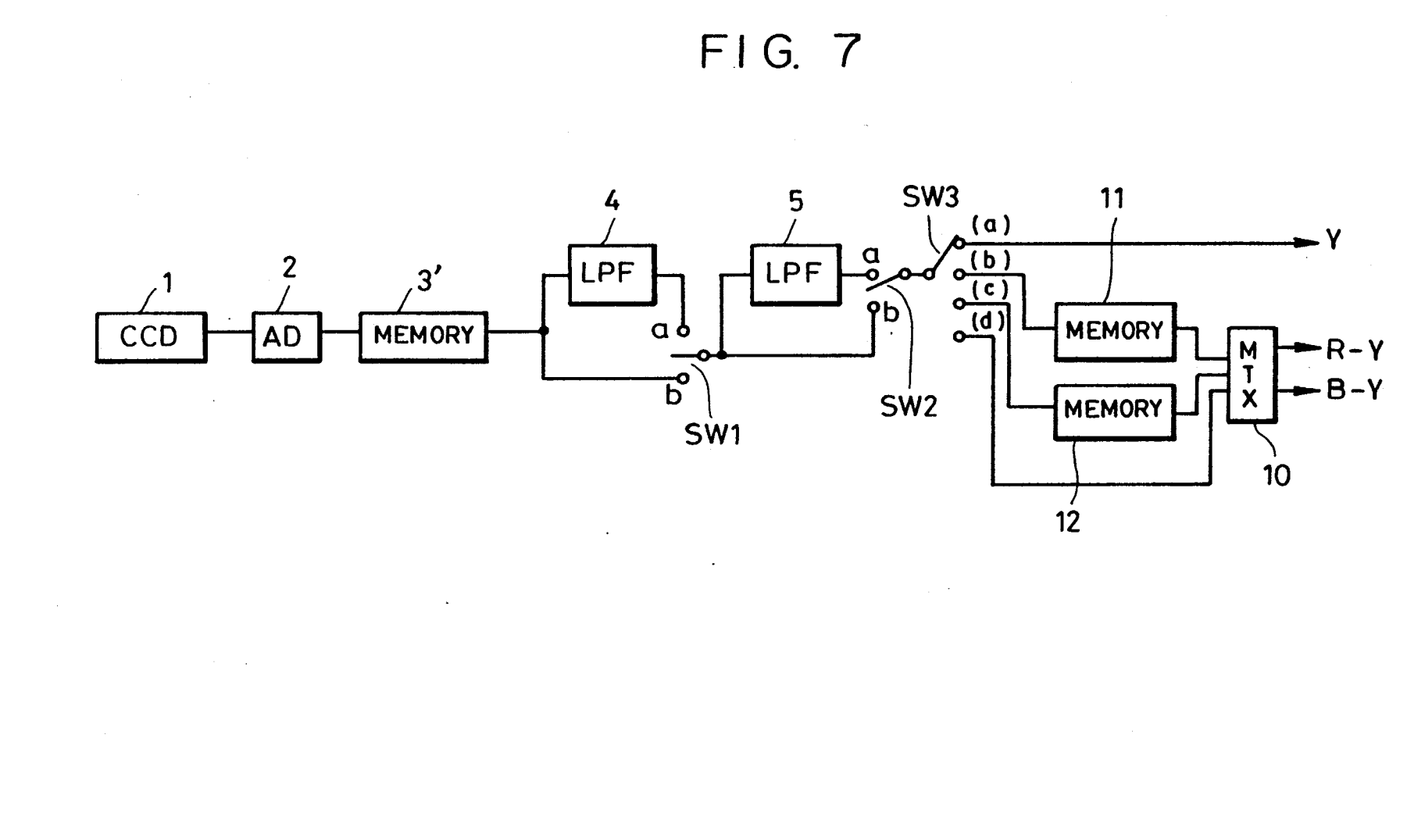
FIG. 7 illustrates another signal processing circuit suitable for the color filter shown in FIG. 1(a)

FIG. 7 illustrates this kind of embodiment. A photoconverted signal from the image pickup device 1 is converted into a digital signal by A to D converter 2 and is stored in a memory 3'. After this Y, G, R and B signals are sequentially read out from the memory 3'. This means that when one signal is read out other signals are also read out, but they are removed by replacing the unwanted signal portions by "0".

When processing the Y signal, switches 1, 2, 3 are respectively connected to terminals a,b,a. The signal passes through low pass filter 4, bypasses filter 5, and passes to the Y signal line. Low pass filter 4 is the same as the filter 4 shown in FIG. 4, having the filter coefficients shown in FIG. 5.

When processing the G signal, switches 1, 2, 3 are respectively connected to terminals b,a,b. The signal bypasses filter 4, passes through filter 5 and is stored in memory 11. Low pass filter 5 is the same as the filter 5 shown in FIG. 4, having the filter coefficients shown in FIG. 6.

When processing the R signal, switches 1, 2, to 3 are respectively connected to terminals a,a,c. The signal passes through both filters 4,5, and is stored in memory 12. Here the filter 4 interpolates the R signal which has an offset sub-sampling pattern, into a square grid pattern like the pattern of the G signal. The R signal has a sampling pitch spacing twice that of the Y signal.

Therefore some "0" samples are deleted from the read-out R signal to thin the signal and convert the pattern of signal samples and "0" samples to match that of the Y signal before the R signal is processed by the filter 4. After filtering by the filter 4, the R signal is expanded by adding a "0" sample between every sample output from the filter 4, in both horizontal and vertical directions. In this way a square grid pattern R signal is obtained matching the pattern of the G signal, and then this R signal is interpolated by the filter 5 so as to interpolate an R sample for every remaining sample position.

The thinning and expanding of the R signal may be done in any suitable known manner, e.g. by appropriate control of the clock rates of the memory 3' and the filters 4,5.

When processing the B signal, the switches 1, 2, to 3 are connected to terminals a,a,d, and the B signal is interpolated by the filters 4 and 5 in the same manner as the R signal. This B signal is then supplied to the matrix circuit 10, while the G and R signals are also supplied to it, from the memories 11 and 12, and the R-Y and B-Y signals are generated.

In this way the Y signal and then the R-Y and B-Y signals are obtained sequentially, and the Y, G, R and B signals from memory 3, are processed sequentially through a common set of filters.

Since high frequency components of the G and R signals stored in the respective memory 11 and 12 are cut off by the filter 5, the G and R signals can be thinned out by half. In this case, the capacity of the memories 11 and 12 can be reduced to ¼ of that of the memory 3'.

Figure 8:
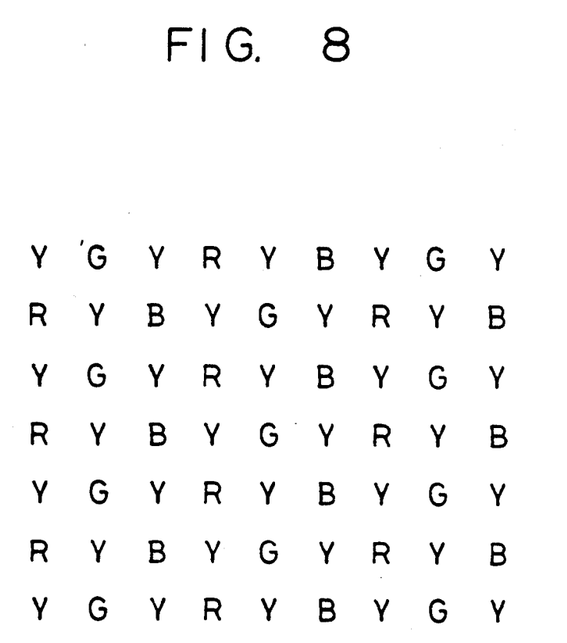
FIG. 8 illustrates a color filter of a second embodiment of the present invention.

FIG. 8 illustrates a color filter of a second embodiment of the present invention.

The difference between the first and the second embodiments is that the filter portions for all three colors other than Y are located in respective offset sub-sampling patterns.

Figure 9:
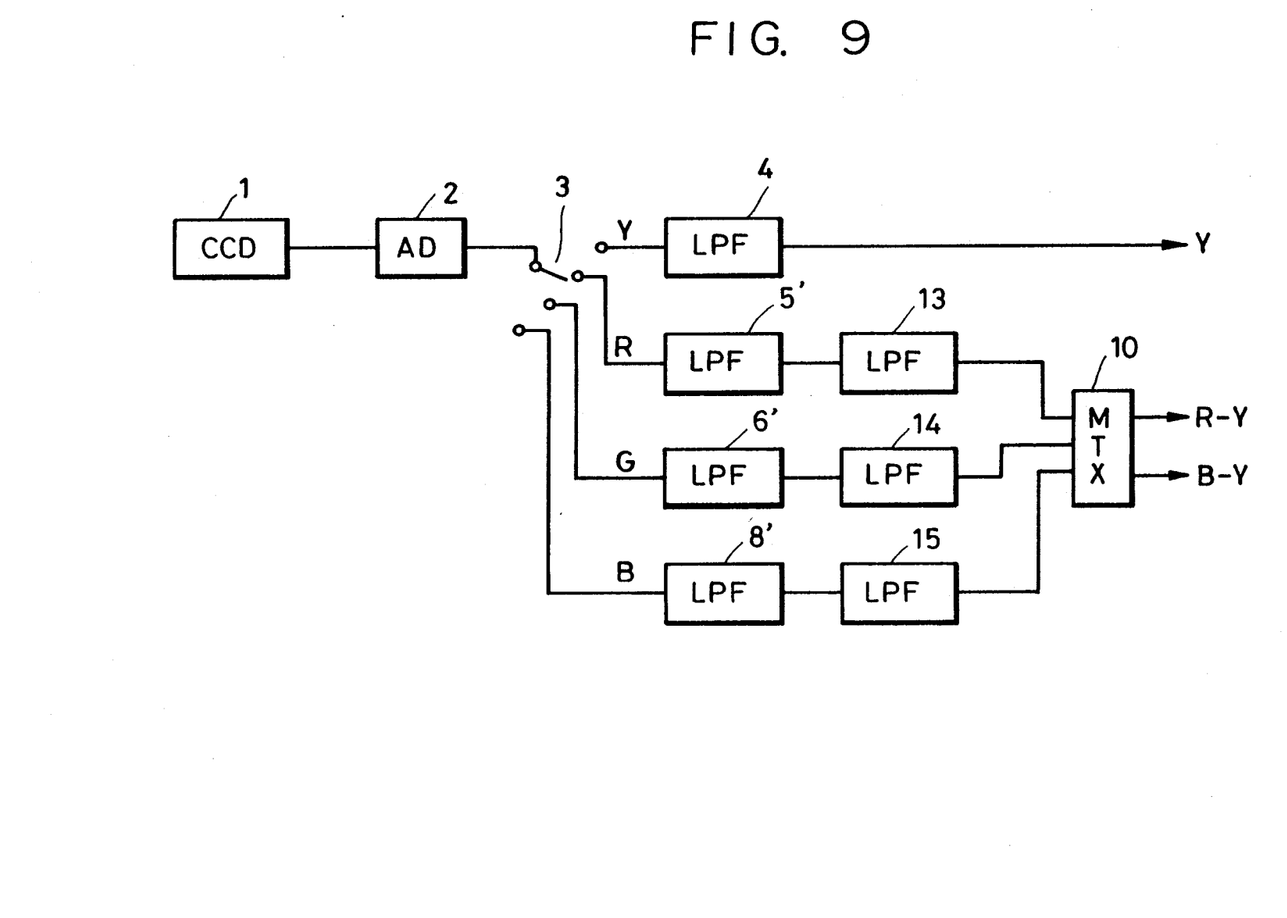
FIG. 9 illustrates a signal processing circuit suitable for the color filter shown in FIG. 8.

FIG. 9 illustrates a block diagram of a processing circuit suitable for use with this color filter. An image signal read out from an image pickup device 1 is converted into a digital signal by an A to D converter 2, and then is delivered to low pass filters 4,5',6',8' respectively each for Y, R, G, B signals.

The filters 5',6',8' have the same coefficients as the filter 4 but the filtering pitch spacings are three times that of the filter 4.

Figure 10:
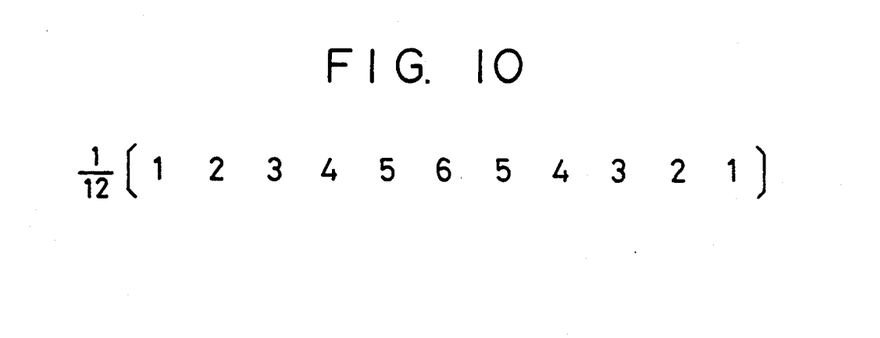
FIG. 10 illustrates filter coefficients for a filter 13 in FIG. 9.

The R, G and B signals then pass to further filters 13, 14, 15, having for example coefficient matrices as shown in FIG. 10. Other features are the same those in FIG. 4.

The block diagram shown in FIG. 9 can be modified for sequential processing in the manner shown in FIG. 7 In this case the filter 5 in FIG. 7 is replaced with the filter 13. When the R signal is processed, it is read out from the memory 3 and then thinned out to ⅓ in the horizontal direction and expanded by inserting two "0" signals between every R signal. The G and B signals are treated in the same way.

In this embodiment the R, G and B color filter portions shown in FIG. 8 are located at a pitch spacing six times that of the cell pitch of the horizontal direction and at the same pitch as the cell pitch of the vertical direction, but these relationships can be exchanged.

The color filter attached to the image pickup device 1 can be modified to have other combinations of colors. For example, the R, G and B filter portions in FIG. 1(a) and FIG. 8 can be replaced by for example Cy, Ye and Mg filter portions respectively. Alternatively, for example, the R and G filter portions can be exchanged with each other.

In other embodiments, a conventional Bayer type filter can be adapted by using the Cy, Ye, Mg group of color filters instead of the R, G, B group. For example, in the embodiment of FIG. 11, the R and B filter portions in FIG. 2 are replaced by Cy and Ye filter portions. With this filter, false color signals in bright images are reduced so that the dynamic range of the image pickup device can be improved, even though the Y sensor output is used to create the color difference signals. This is because the higher transparency of the Cy and Ye filter portions reduces the tendency for the Y sensor portions to saturate while the color sensor portions do not. If all the sensor portions saturate the image detection device will tend to output signals for white, so there is no false color in this case.

Figure 11:
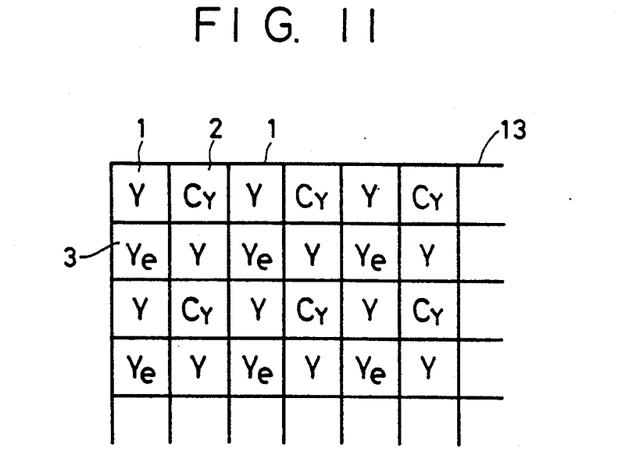
FIGS. 11 and 12 illustrate color filters of other embodiments of the present invention.

In FIG. 11 the Y filter portions can be transparent or no filter can be located on them or they can be ND (Neutral Density) filter portions. ND filter portions can further help to avoid false color by matching the saturation brightness for the Y signal to the saturation brightness for other color signals, but in this case it is advantageous to use Cy,Ye,Mg high transparency color filter portions 50 to that the density of the Y portions does not need to be so great. A high density ND filter on the Y portions will reduce sensitivity.

Figure 13:
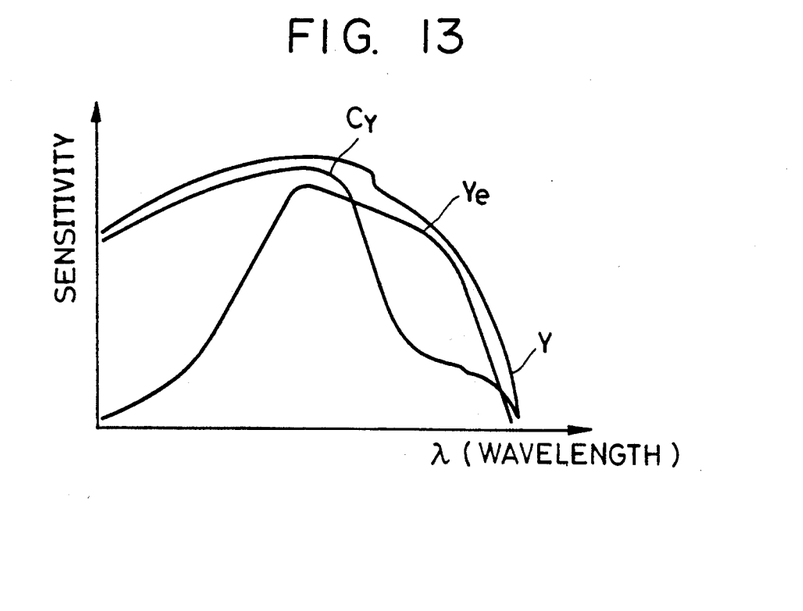
FIG. 13 illustrates the spectrum characteristics of the color filters in FIGS. 11 and 12.

FIG. 13 illustrates the spectrum characteristics of the Y, Cy and Ye filters in FIG. 11 in the condition that there is an IR (Infra Red) cut filter (for example CM-500) in front of them. Here the spectrum characteristics of the Y filter portions are determined by the spectrum characteristics of the IR cut filter and the image pickup device if no filter is attached to the Y portions.

Figure 14:
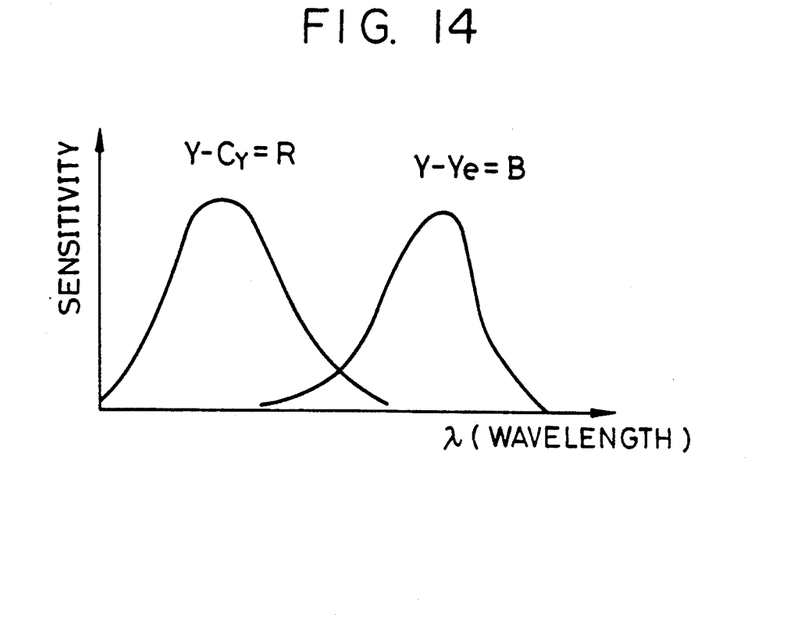
FIG. 14 illustrates the spectrum characteristics of color difference signals obtained by using the color filters of FIGS. 11 and 12.

FIG. 14 illustrates spectrum characteristics of (Y-Cy), (Y-Ye). As can be understood from FIG. 14 the spectrum characteristic of Y-Cy clearly corresponds to that of the R color, as does the spectrum characteristic of Y-Ye to that of the B color. Therefore signal processing can be simplified. R and B signals can be obtained from Y, Cy and Ye signals by the following equations:

$$R = k.Y - \alpha.Cy$$

$$B = k.Y - \beta.Ye$$

(here k, $\alpha$, $\beta$ are constants).

Figure 12:
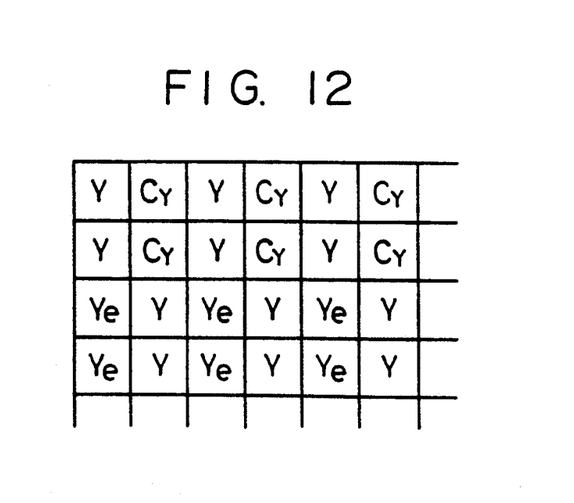

FIG. 12 illustrates another embodiment of the present invention. In this embodiment the pattern of one horizontal line of color filter portions is repeated in the next horizontal line before a different pattern is used.

This filter can make the signal processing easier in, for example, the NTSC system if the image pickup device scans in interlace manner. In this case the filter pattern of FIG. 12 allows line sequential R and B signals to be obtained in each field.

What is claimed is:

1. An image detection apparatus comprising:
   color filter means for receiving light and for passing luminance components and color components of the light, said color filter means having first and second lines with filter elements for luminance components disposed in each line and offset from filter elements for luminance components in an adjacent line, said first line including filter elements for two color components, and said second line including filter elements for a single color component;
   image sensor means for receiving the luminance components and the color components passed by said color filter means, and for outputting a plurality of signals corresponding to the respective luminance components and color components; and
   signal processing means for receiving the plurality of signals output by said image sensor means, and for generating a color difference signal from the received plurality of signals.

2. An image detection apparatus according to claim 1, wherein the plurality of signals received by said signal processing means to generate the color difference signal saturate at substantially similar levels of image brightness.

3. An apparatus according to claim 1, wherein said signal processing means generates the color difference signal independent of a subset of the plurality of signals output by said image sensor means which correspond to the luminance components.

4. An apparatus according to claim 1, wherein said filter elements for luminance components comprise holes through said color filter means.

5. An apparatus according to claim 1, wherein said filter elements for luminance components comprise neutral density filter elements.

6. An apparatus according to one of claim 1, claim 4 or claim 5, wherein said color filter means comprises a set of color filter elements for color components of the light, and wherein said signal processing means generates the color difference signal from a subset of the plurality of signals output by said image sensor means which correspond to the color components.

7. An apparatus according to claim 6, wherein said set of color filter elements passes at least one of a cyan component, a yellow component, and a magenta component.

8. An image detection apparatus comprising:
   color filter means for receiving light and for passing components of the light, said color filter means having first, second and third sets of filter elements for passing a first color component, a second color component and a third color component, respectively, of the light, and a fourth set of filter elements for passing a luminance component of the light, said first, second, third and fourth sets of filter elements being arranged to form first and second lines with said fourth set of filter elements for passing other luminance component disposed in each line and offset from said fourth set of filter elements for passing the luminance component in an adjacent line, said first line including said first and second sets of filter elements, and said second line including only said third set of filter elements in addition to said fourth set;
   image sensor means for receiving the light components passed by said color filter means, and for outputting each of (i) a first color signal corresponding to the first color component passed by said first set of filter elements, (ii) a second color signal corresponding to the second color component passed by said second set of filter elements, (iii) a third color signal corresponding to the third color component passed by said third set of filter elements, and (iv) as luminance signal corresponding to the luminance component passed by said fourth set of filter elements; and
   signal processing means for receiving the first, second and third color signals output by said image sensor means, and for generating, independent of the luminance signal, color difference signals from the first, second and third color signals.

9. An apparatus according to claim 3 or claim 8, wherein each of the color components comprises one of a red component, a green component, and a blue component.

10. A color filter for an image sensor, comprising:
    a plurality of luminance filter elements for passing a luminance component of an image; and
    first, second, and third color filter elements for passing first, second, and third color components, respectively, of the image,
    wherein said color filter has first and second lines with luminance filter elements disposed in each line and offset from luminance filter elements in an adjacent line, said first line including two of said first, second, and third color filter elements, and said second line including a single one of said first, second, and third color filter elements.

11. A color filter according to claim 10, wherein the first, second, and third color components comprise a red component, a blue component, and a green component, respectively.

12. A color filter according to claim 10, wherein the first, second, and third color components comprise a cyan component, a yellow component, and a magenta component, respectively.

13. A color filter for an image sensor, comprising:
    a plurality of luminance filter elements for passing a luminance component of an image; and
    first, second and third color filter elements for passing first, second and third color components, respectively, of the image, wherein at least one of the first, second and third color components comprises one of a cyan component, a yellow component, and a magenta component, said color filter having first and second lines with luminance filter elements disposed in each line and offset from luminance filter elements in an adjacent line, said first line including said first and second color filter elements, and said second line including said third color filter elements.

14. A color filter for an image sensor, comprising:
first, second and third adjacent lines, each line comprising (i) luminance filter elements for passing luminance components of an image and (ii) color filter elements for passing a single color component of the image, said luminance filter elements being interleaved between each of said color filter elements, and said first, second, and third adjacent lines being arranged such that said luminance filter elements of said first line are offset from said luminance filter elements of said second line, and luminance filter elements of said second line are not offset from said luminance filter elements of said third line.

15. A color filter according to claim 14, wherein said color filter elements of said first and second lines are arranged in an offset pattern.

16. A color filter according to one of claim 14 or claim 15, wherein said color filter elements of said second and third lines comprise the same pattern without offset.

17. A color filter for an image sensor, comprising:
a plurality of luminance filter elements for passing a luminance component of an image;
a plurality of color filter elements for passing first, second and third color components of the image; and
first and second lines having said plurality of luminance filter elements and said plurality of color filter elements disposed in each line and offset from respective luminance filter elements and color filter elements in an adjacent line, said first line including color filter elements for passing said first and second color components of the image, and said second line including only said color filter elements for passing said third color component of the image in addition to said luminance filter elements.

18. A color filter according to claim 17, wherein said color filter elements for passing the third color component are arranged in an offset pattern from the color filter elements for passing said first and second color components of the image.

19. A color filter according to any one of claims 10, 13, 14, and 17, wherein said luminance filter elements comprise holes through said color filter.

20. A color filter according to any one of claims 10, 13, 14, and 17, wherein said luminance filter elements comprise neutral density elements.

* * * * *

UNITED STATES PATENT AND TRADEMARK OFFICE
CERTIFICATE OF CORRECTION

PATENT NO. : 5,323,233
DATED : June 21, 1994
INVENTOR(S) : TAKU YAMAGAMI, ET AL.

It is certified that error appears in the above-identified patent and that said Letters Patent is hereby corrected as shown below:

ON TITLE PAGE

In [56] References Cited, under FOREIGN PATENT DOCUMENTS:
"313192   1/1991   Japan ." should read
--3-13192   1/1991   Japan .--.
In [57] ABSTRACT, Line 4, "which" should read --with--.

COLUMN 1

Line 12, "Description Related" should read
--Description of the Related--.
Line 17, "No. 3971,065" should read --No. 3,971,065--.
Line 40, "ut" should read --but--.
Line 66, "characterised" should read --characterized--.

COLUMN 4

Line 23, "etc" should read --etc.--.
Line 26, "CC" should read --CCD--.

COLUMN 5

Line 27, "2, to 3" should read --2, 3--.
Line 49, "2, to 3" should read --2, 3--.
Line 58, "3," should read --3'--.

COLUMN 6

Line 57, "to" should read --so--.

COLUMN 7

Line 46, "saturate" should read --saturates--.

UNITED STATES PATENT AND TRADEMARK OFFICE
CERTIFICATE OF CORRECTION

PATENT NO. : 5,323,233

DATED : June 21, 1994

INVENTOR(S) : TAKU YAMAGAMI, ET AL.

It is certified that error appears in the above-identified patent and that said Letters Patent is hereby corrected as shown below:

COLUMN 8

Line 38, "to claim 3" should read --to one of claim 3--.

Signed and Sealed this

Twenty-fourth Day of January, 1995

Attest:

BRUCE LEHMAN

Attesting Officer

Commissioner of Patents and Trademarks